United States Patent
Dandurand

(10) Patent No.: US 7,063,396 B2
(45) Date of Patent: Jun. 20, 2006

(54) ENDLESS TRACK WITH VARIOUS HARDNESSES FOR A RECREATIONAL VEHICLE

(75) Inventor: Jules Dandurand, Sherbrooke (CA)

(73) Assignee: Camoplast Inc. (CA)

( * ) Notice: Subject to any disclaimer, the term of this patent is extended or adjusted under 35 U.S.C. 154(b) by 0 days.

(21) Appl. No.: 11/048,084

(22) Filed: Feb. 1, 2005

(65) Prior Publication Data

US 2005/0168070 A1    Aug. 4, 2005

(30) Foreign Application Priority Data

Feb. 2, 2004    (CA) .................................... 2456622

(51) Int. Cl.
*B62D 55/24* (2006.01)
(52) U.S. Cl. ........................... 305/178; 305/165
(58) Field of Classification Search ............... 305/46, 305/51, 160, 165, 178, 179, 180
See application file for complete search history.

(56) References Cited

U.S. PATENT DOCUMENTS

| 4,938,546 | A  | * | 7/1990 | Simmons ..................... 305/180 |
| 5,713,645 | A  | * | 2/1998 | Thompson et al. ......... 305/168 |
| 6,568,769 | B1 | * | 5/2003 | Watanabe et al. ........... 305/171 |
| 2002/0145335 | A1 | * | 10/2002 | Soucy et al. ................ 305/166 |
| 2004/0026995 | A1 | * | 2/2004 | Lemieux ..................... 305/178 |

FOREIGN PATENT DOCUMENTS

CA    2 319 934    11/2004

\* cited by examiner

*Primary Examiner*—Russell D. Stormer
(74) *Attorney, Agent, or Firm*—Akerman Senterfitt

(57) ABSTRACT

An endless track for a recreational vehicle, such as a snowmobile on all-terrain vehicle, is formed of an endless body made of rubber material having a ground engaging side and an inner side, the outer side displaying a series of longitudinally spaced profiles extending along the track; the track is characterized in that the rubber material of one profile has a hardness which is greater than the hardness of the rubber material of one or more of the succeeding profiles.

3 Claims, 1 Drawing Sheet

ENDLESS TRACK WITH VARIOUS HARDNESSES FOR A RECREATIONAL VEHICLE

FIELD OF THE INVENTION

Figure 1:
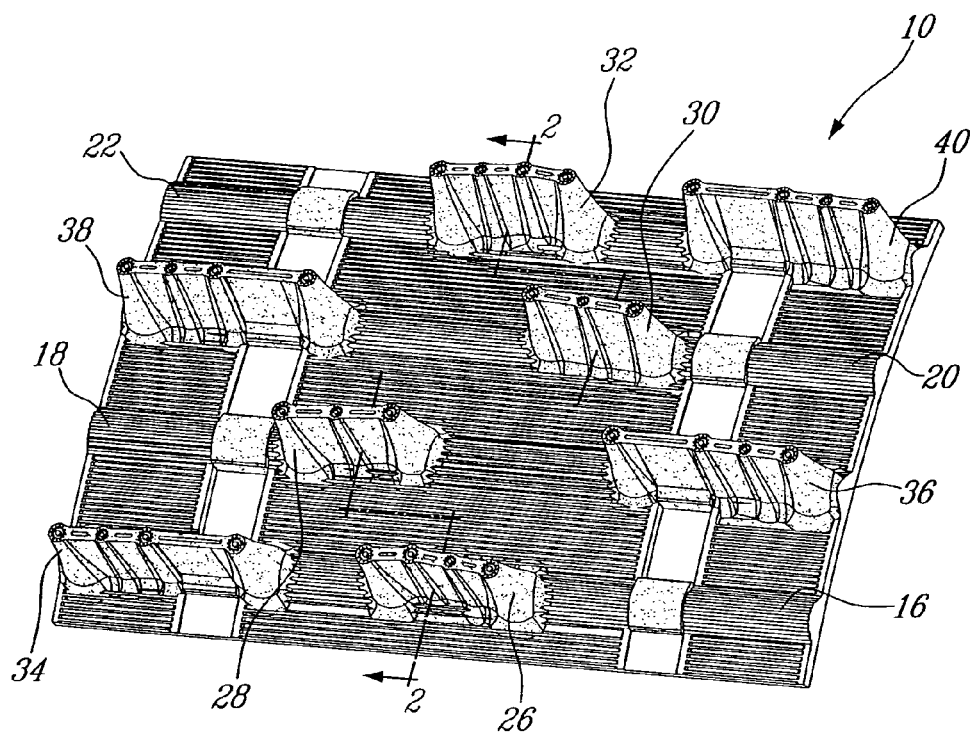

The present invention relates to an endless track for recreational vehicles such as a snowmobile or an all-terrain vehicle in which the rubber material varies in hardness from one profile to the other.

BACKGROUND OF THE INVENTION

A track which is used on recreational vehicles designed to travel on snow, such as a snowmobile, or grounds, such as an all-terrain vehicle, consists basically of an endless body of molded rubber material that is flexible so that it may follow curvatures as it passes around drive and idler sprocket wheels forming part of the track driving system.

Endless tracks which are found more particularly on snowmobiles or all-terrain vehicle are made of rubber material which is reinforced with longitudinally spaced and transversally disposed rods embedded in the rubber material. The inner side of the track is usually flat with serially spaced lugs which are adapted to engage the driving wheels. The outer side of the track displays a series of longitudinally spaced transverse profiles for engaging the snow or ground over which the snowmobile travels. These profiles thus provide traction to the vehicle on snow, mud, ice or any similar surfaces.

Some tracks exist in which the rubber material in the lateral portion of the outer side profiles has a lower hardness value than that of the rubber material in the central portion of the outer side profiles to allow the track to bend more easily during a sharp turn while still being rigid enough at the center for maintaining a good traction during use. Such a track may be found described in Canadian patent application No. 2,319,934 filed Sep. 18, 2000 and published Mar. 18, 2002.

However, while these known tracks facilitate the steering capability of these types of vehicles, it does not improve traction of the profile when travelling in surfaces which, in some cases, are hard (packed snow or ice) and, in other cases, soft (deep snow).

OBJECTS AND STATEMENT OF THE INVENTION

It is an object of the present invention to provide a track with profiles of different hardnesses of rubber material to increase its traction on different types of ground conditions.

This is achieved by providing an endless track for snowmobile wherein the rubber hardness of one profile is different from that of one or more of its succeeding profiles.

This construction enables the track to maintain good traction in various snow conditions as the profile having a soft rubber material will flatten soft snow allowing the succeeding profile to have good traction on the snow flattened by the preceeding profile. On an icy surface, greater adherence of the vehicle track is achieved by the profiles having a soft rubber material.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

Figure 2:
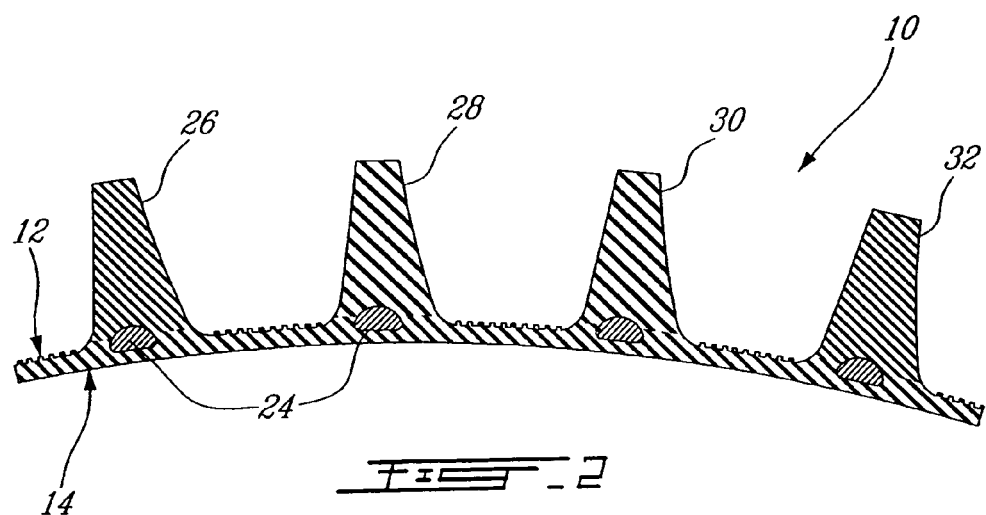

FIG. 1 is a top perspective view of a segment of an endless track made in accordance with the present invention; and FIG. 2 is a cross-sectional view taken along lines 2—2 of FIG. 1.

DESCRIPTION OF PREFERRED EMBODIMENTS

Referring to FIGS. 1 and 2, there is shown a segment 10 of an endless track used for example for driving a recreational vehicle, such as a snowmobile or an all-terrain vehicle.

The track 10 consists of a body made of rubber material having outer surface 12 and an inner surface 14. The outer surface 12 displays a series of longitudinally spaced embossed areas (four being shown as 16, 18, 20 and 22) in which are embedded a transverse rod 24 usually made of plastic material.

In these embossed areas, there are provided profiles such as 26, 28, 30 and 32 which may extend along the entire width of the track or, as illustrated in the drawings, may be transversally spaced from adjacent profiles 34, 36, 38 and 40, respectively.

As illustrated in FIG. 2, the present invention is concerned with providing different type of hardnesses in the rubber material of the profiles. In the embodiment illustrated, profiles 26 and 34 have a hardness value similar to that of profiles 32 and 40 but greater than the two intermediate profiles 28, 36 and 30, 38.

The rubber material of the profiles 28, 36 and 30, 38 preferably has an average hardness of between about 55 and about 75 duro A while the rubber material of the profiles 26, 34 and 32, 40 may have an average hardness of about 75 and about 90 duro A. The hardness of the rubber material of the profiles 28, 36 and 30, 38 is the same as that of the rubber material of the main body of the endless track.

Although the invention has been described above in relation to one specific embodiment, it will be evident to a person skilled in the art that it may be varied in different ways. For example, the alternance of soft and rubber profiles may vary, especially in view of the profile configurations, such as one row of hard rubber profiles followed by two, three, four or five rows of soft rubber profiles. It is therefore wished to have it understood that the present invention should not be limited in interpretation, except by the terms of the following claims.

The invention claimed is:

1. A track for a recreational vehicle comprising:
   an endless body made of rubber material having a ground engaging side and an inner side; and
   a series of longitudinally spaced rows of propulsive profiles on said ground engaging side, said longitudinally spaced rows of propulsive profiles extending in a lateral direction of the track,
   wherein the rubber material of all profiles of one row has a hardness which is greater than the hardness of the rubber material of all profiles in one or more succeeding rows.

2. An endless track as defined in claim 1, characterized in that the rubber material having greater hardness has a value of between 75 and 90 duro A.

3. An endless track as defined in claim 2, wherein the rubber material of the succeeding profile has an hardness value of between 55 and 75 duro A.

* * * * *